United States Patent [19]
Morris

[11] Patent Number: 5,823,609
[45] Date of Patent: Oct. 20, 1998

[54] FORWARD TILT WINDSHIELD

[75] Inventor: Kalon W. Morris, Cambridge, Mass.

[73] Assignee: Kalon Morris, San Clemente, Calif.

[21] Appl. No.: 775,180

[22] Filed: Dec. 30, 1996

[51] Int. Cl.$^6$ ........................................................ B60J 1/02
[52] U.S. Cl. ...................... 296/180.1; 296/208; 296/84.1
[58] Field of Search .................... 296/84.1, 208, 296/180.1; D12/91, 92

[56] References Cited

U.S. PATENT DOCUMENTS

| | | | |
|---|---|---|---|
| D. 092,848 | 7/1934 | Keppeley, Jr. | 296/84.1 |
| D. 170,576 | 10/1953 | Johnson | 296/84.1 X |
| D. 170,693 | 10/1953 | Johnson | D12/92 |
| D. 173,733 | 12/1954 | Juliano | 296/84.1 X |
| D. 192,497 | 4/1962 | Bailey | D12/92 |
| 1,834,469 | 12/1931 | Mills et al. | 296/84.1 |
| 4,601,510 | 7/1986 | Schoppel et al. | 296/208 X |

FOREIGN PATENT DOCUMENTS

| | | | |
|---|---|---|---|
| 1210499 | 9/1959 | France | 296/84.1 |
| 481049 | 3/1938 | United Kingdom | 296/84.1 |

*Primary Examiner*—Dennis H. Pedder

[57] ABSTRACT

A new aerodynamic design for an automobile is called the Forward Tilt Windshield. By positioning the car's windshield such that the angle between the windshield and hood is less than ninety degrees, the Forward Tilt Windshield will direct downward the air encountered by the car during forward travel. The air flow will then be directed into a open-ended channel, from the base of the windshield to the bottom of the car, by contouring the windshield such that its outer edges at the sides of the car are further forward than the middle of the windshield. This total design concept will reduce the "over-weighting" effect caused by conventional windshield and will improve the car's fuel efficiency.

1 Claim, 1 Drawing Sheet

FORWARD TILT WINDSHIELD

SUMMARY

The Forward Tilt Windshield is an improvement upon normal automobile aerodynamic designs in that it will drastically decrease the amount of drag that a car experiences during normal cruising speeds due to air resistance, and will thereby increase the miles that can be traveled per gallon of fuel. This invention entails moving the windshield such that its top edge (at the roof of the car) is farther forward (towards the direction of travel) than its bottom (where it meets the hood). In other words, the angle between the windshield and the hood will be less than ninety (90) degrees. This will channel the air in the path of the car downward rather than over the car as is the usual manner.

DRAWINGS

Figure 1:
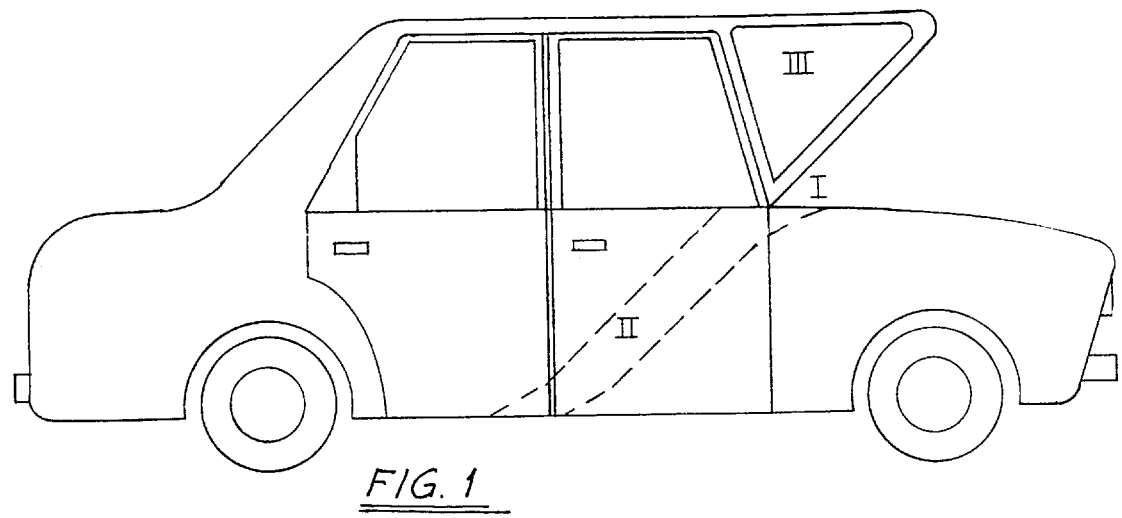

FIG. 1 Side view of an automobile with the Forward Tilt Windshield showing that the angle (I) between the windshield and the hood is less than ninety (90) degrees. The broken lines (II) show the channel through the middle of the car used to conduct air. The triangle (III) between the windshield's edge and the front door is a window.

Figure 2:
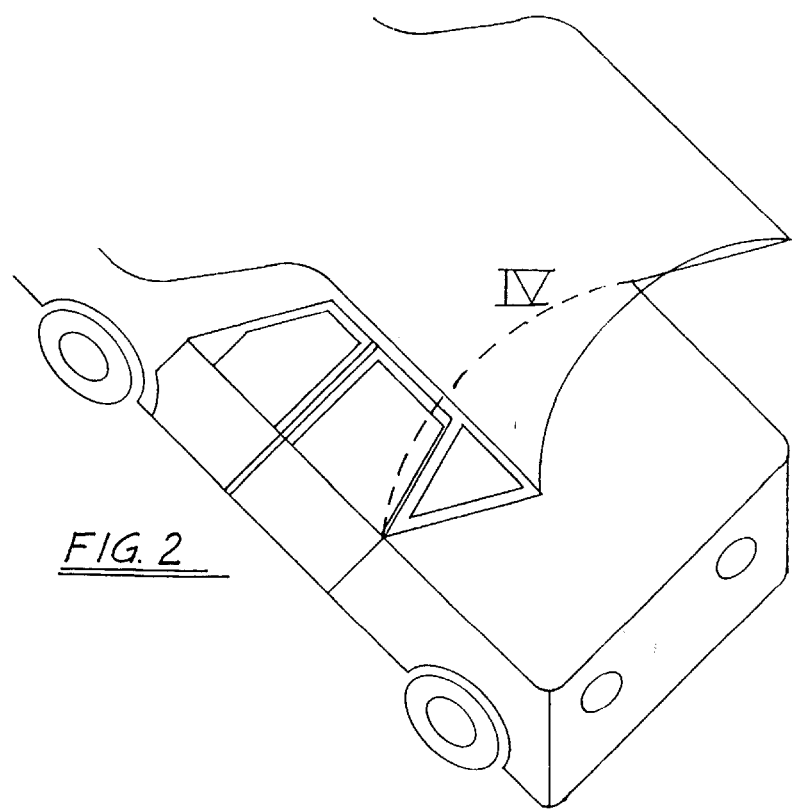

FIG. 2 Isometric view of an automobile with the Forward Tilt Windshield from in front of and above its front right corner. The broken line (IV) denotes where the windshield connects with the hood. This view shows how the windshield can be contoured to direct air flow through the channel to underneath the car by placing the outside edges of the windshield farther forward than the middle.

DESCRIPTION

The Forward Tilt Windshield is an improvement upon conventional automobile aerodynamic designs. The windshields on modern cars are angled such that the air they encounter at cruising speed is directed upward and over the car. Due to the pressure of the air against the windshield (which increases as speed increases) a force will be produced on the car that has both backwards (against the direction of travel) and downwards components. This downward component produces an "over-weighting" effect which retards the progress of the car.

The Forward Tilt Windshield will eliminate this downward force and will produce instead an upwards component that will "lighten" the car. Less energy will be needed to accelerate the car or keep it moving at constant speed. That is, the car's engine will need to burn less fuel than before to keep the car moving.

The Forward Tilt Windshield accomplishes this by moving the car's windshield such that its top edge (at the roof) is farther forward (in the direction of travel) than its bottom edge. That is, the angle between the windshield and the hood will be less than ninety (90) degrees. This angle is denoted by numeral I in drawing one.

The air encountered by a car with the Forward Tilt Windshield during forward travel will be directed downward and can be: 1) passed under the car by means of a channel passing though the middle of the car, originating at the base of the windshield and ending on the underside of the car. This channel is denoted by numeral II in drawing one. This would entail contouring the windshield such that its edges at the outside of the car body are farther forward than its middle. This contour can be seen in numeral IV of drawing two. Although this will create a slightly larger area on the car for the air to come in contact with, the added air resistance will be minimal because the air's pressure in the channel will be considerably less than before due to its increased velocity when traveling through the constricting channel. Also, when the air exits this channel an additional force of thrust (due to conservation of momentum) will be produced on the car that will have both forwards (in the direction of travel) and upwards components. This will further enhance the aerodynamic properties of the Forward Tilt Windshield. Or 2) the air could be passed around the sides of the car by having the middle of the windshield farther forward than its side edges.

When using the Forward Tilt Windshield, the driver's visibility can be increased by placing a window in the triangle between the windshield's edge, the front door, and the roof This is shown as numeral III in drawing one. Also, a window can be placed in the forward part of the car's roof just behind the windshield's top edge.

I claim:

1. A Forward Tilt Windshield which improves the aerodynamics of automobiles by directing the air flow encountered by the car during forward travel first downward by positioning the car's windshield such that the angle between the windshield and the hood is less than ninety (90) degrees then into a open-ended channel, passing through the middle of the car and angled similarly to the windshield and originating at the windshield's base and terminating at the underside of the car, by contouring the windshield such that its outer edges at the sides of the car are further forward than its middle.

* * * * *